US012724668B2

(12) United States Patent
Mylavarapu

(10) Patent No.: US 12,724,668 B2
(45) Date of Patent: Sep. 1, 2026

(54) LOGICAL COUNTERS FOR A MEMORY SYSTEM

(71) Applicant: Micron Technology, Inc., Boise, ID (US)

(72) Inventor: Sai Krishna Mylavarapu, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 24 days.

(21) Appl. No.: 18/421,444

(22) Filed: Jan. 24, 2024

(65) Prior Publication Data

US 2024/0264904 A1 Aug. 8, 2024

Related U.S. Application Data

(60) Provisional application No. 63/443,852, filed on Feb. 7, 2023.

(51) Int. Cl.

*G06F 11/10* (2006.01)
*G06F 11/07* (2006.01)
*G06F 11/14* (2026.01)

(52) U.S. Cl.

CPC ........ *G06F 11/1068* (2013.01); *G06F 11/076* (2013.01); *G06F 11/1435* (2013.01)

(58) Field of Classification Search

CPC ............... G06F 11/1068; G06F 11/076; G06F 11/1435; G06F 11/1048; G11C 29/42; G11C 2029/0409; G11C 2029/0411; G11C 29/02; G11C 29/022; G11C 29/52; G11C 29/20

USPC .......................................................... 714/764

See application file for complete search history.

(56) References Cited

U.S. PATENT DOCUMENTS 10,733,110 B1 * 8/2020 Volpe .................... G06F 3/0656
11,301,372 B1 * 4/2022 Huo .................... G06F 12/0882
11,604,693 B2 * 3/2023 Ryu ...................... G06F 11/106
2004/0213070 A1 * 10/2004 Ueno ...................... G06F 3/064 711/E12.008
2016/0342509 A1 * 11/2016 Kotte .................. G06F 12/0246
2018/0067650 A1 * 3/2018 Hayakawa .......... G06F 12/0638
2021/0089233 A1 * 3/2021 Ueda ..................... G06F 3/0659

* cited by examiner

*Primary Examiner* — James C Kerveros

(74) *Attorney, Agent, or Firm* — Holland & Hart LLP

(57) ABSTRACT

Methods, systems, and devices for logical counters for a memory system are described. A controller within a memory system may generate one or more logical counters that each correspond to a management counter of a memory die. The controller may store the logical counters at a logical address space associated with the memory system. The logical address space may correspond to a physical location within a memory array of the memory die. The controller may periodically read a value of a management counter and store the value to the logical counter. In some examples, if the memory system detects an error condition for the management counter, the memory system may perform a recovery operation for the data stored at the memory die.

20 Claims, 5 Drawing Sheets

LOGICAL COUNTERS FOR A MEMORY SYSTEM

CROSS REFERENCE

The present application for patent claims priority to U.S. Patent Application No. 63/443,852 by Mylavarapu et al., entitled "LOGICAL COUNTERS FOR A MEMORY SYSTEM," filed Feb. 7, 2023, which is assigned to the assignee hereof, and which is expressly incorporated by reference in its entirety herein.

TECHNICAL FIELD

The following relates to one or more systems for memory, including logical counters for a memory system.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
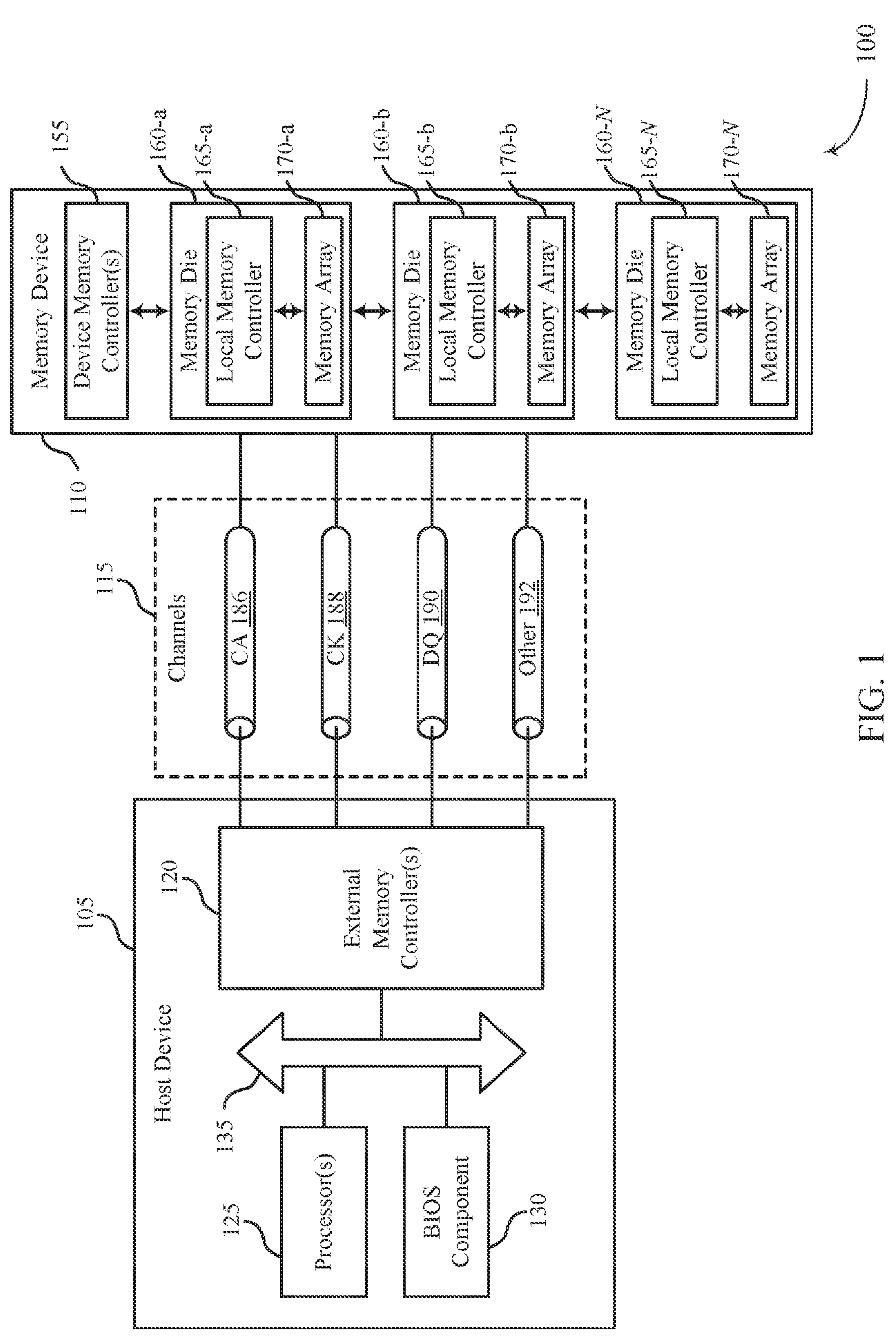
FIG. 1 illustrates an example of a system that supports logical counters for a memory system in accordance with examples as disclosed herein.

Some memory systems may include one or more memory controllers and one or more memory dies. The memory dies may be associated with (e.g., contain, include) one or more on-die management counters (e.g., one or more counters disposed on each memory die). Such management counters may track metadata associated with operating respective memory die. For example, management counters may track (e.g., count) quantities of access operations performed on the memory die (e.g., a particular bank or word line of a memory array of the memory die), or may track other metrics such as quantities of instructions executed at a particular die. The management counters may be utilized when determining to perform a maintenance operation on a particular memory die, which may increase the lifetime of the memory die and/or reduce risks related to row-hammer attacks.

However, because management counters may be updated (e.g., incremented) frequently, the management counters may experience higher levels of wear than the memory cells of the particular die. Such frequent accesses may result in the management counters failing before memory cells of a particular die. Such failures may result in a need for the memory die to be discarded, despite the cells of the die being valid. Accordingly, a memory system configured to utilize logical counters may be desirable.

A memory system configured to use logical counters is described herein. In some examples, one or more memory system controllers may generate one or more logical counters (e.g., metacounters). Each logical counter may correspond to a management counter of a particular memory die. The one or more controllers may store the logical counters at one or more addresses (e.g., logical addresses) of a logical address space that may otherwise be utilized for storing metadata of the memory system. In some examples, the logical addresses may each correspond to a physical location (e.g., a physical address) within a memory array of the memory die.

To improve the reliability of a management counter of a memory die, the one or more controllers may periodically read a value from a management counter and may store the value to the logical counter. For example, the one or more controllers may store the value to a physical address associated with the logical address of the logical counter. In some examples, if the memory system detects an error condition (e.g., a failure) of the management counter, the memory system may perform a recovery operation for the data stored in the memory die. Accordingly, by utilizing logical counters as described herein, the memory system may preserve data when a management counter fails, which may improve the overall reliability and life of the system.

Features of the disclosure are initially described in the context of systems and dies as described with reference to FIG. 1. Features of the disclosure are described in the context of a system and a process flow as described with reference to FIGS. 2 and 3. These and other features of the disclosure are further illustrated by and described with reference to an apparatus diagram and flowcharts that relate to logical counters for a memory system as described with reference to FIGS. 4 and 5.

FIG. 1 illustrates an example of a system 100 that supports logical counters for a memory system in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of one or more external memory controllers 120. In some examples, the one or more external memory controllers 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the one or more external memory controllers 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include one or more device memory controllers 155 and one or more memory dies 160 (e.g., memory chips) to support a capacity (e.g., a desired capacity, a specified capacity) for data storage. Each memory die 160 (e.g., memory dic 160-*a*, memory die 160-*b*, memory die 160-N) may include one or more local memory controllers 165 (e.g., local memory controller 165-*a*, local memory controller 165-*b*, local memory controller 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The one or more device memory controllers 155 may include components (e.g., circuitry, logic) operable to control operation of the memory device 110. The one or more device memory controllers 155 may include hardware, firmware, or instructions that enable the memory device 110 to perform various operations and may be operable to receive, transmit, or execute commands, data, or control information related to the components of the memory device 110. The one or more device memory controllers 155 may be operable to communicate with one or more of the external memory controller 120, the one or more memory dies 160, or the processor 125. In some examples, the one or more device memory controllers 155 may control operation of the memory device 110 described herein in conjunction with the one or more local memory controllers 165 of the memory die 160.

In some examples, the memory device 110 may communicate information (e.g., data, commands, or both) with the host device 105. For example, the memory device 110 may receive a write command indicating that the memory device 110 is to store data received from the host device 105, or receive a read command indicating that the memory device 110 is to provide data stored in a memory die 160 to the host device 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, one or more device memory controllers 155 may generate one or more logical counters (e.g., metacounters). Each logical counter may correspond to a management counter of a particular die 160. The one or more device memory controllers 155 may store the logical counters at one or more addresses (e.g., logical addresses) of a logical address space that may otherwise be utilized for storing metadata of the memory device 110. In some examples, the logical addresses may each correspond to a physical location (e.g., a physical address) within a memory array 170 of the memory die 160.

To improve the reliability of a management counter of a memory die 160, the one or more device memory controllers 155 may periodically read a value from a management counter and may store the value to the logical counter. For example, the one or more device memory controllers 155 may store the value to a physical address associated with the logical address of the logical counter. In some examples, if the one or more device memory controllers 155 detect(s) an error condition (e.g., a failure) of the management counter, the memory device 110 may perform a recovery operation for the data stored in the memory die 160. Accordingly, by utilizing logical counters as described herein, the memory device 110 may preserve data when a management counter fails, which may improve its overall reliability and life.

Figure 2:
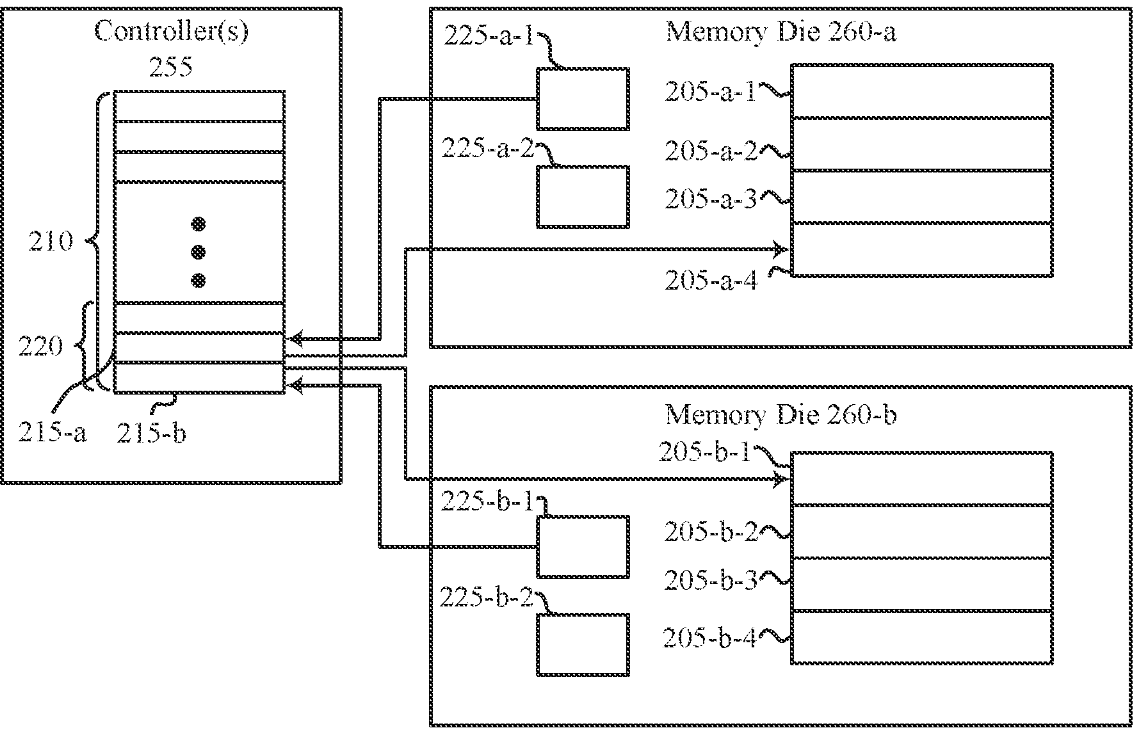
FIG. 2 illustrates an example of a system that supports logical counters for a memory system in accordance with examples as disclosed herein.
Figure 2:

FIG. 2 illustrates an example of a system 200 that supports logical counters for a memory system in accordance with examples as disclosed herein. The system 200 may be an example of or may include aspects of the memory device 110 as described with reference to FIG. 1. For example, the system 200 may include one or more controllers 255 (e.g., one or more device memory controllers), and one or more memory dies 260 which may each include one or more memory arrays (e.g., arranged in one or more banks). The system 200 may utilize logical counters as described herein, which may improve the overall reliability and life of the system 200.

In some cases, a physical location of a set of memory cells may have an associated physical address 205. For example, the memory die 260-*a* may include a first set of memory cells associated with a physical address 205-*a*-1, a second set of memory cells associated with a physical address 205-*a*-2, a third set of memory cells associated with a physical address 205-*a*-3, and a fourth set of memory cells associated with a physical address 205-*a*-4. Additionally, the memory die 260-*b* may include a first set of memory cells associated with a physical address 205-*b*-1, a second set of memory cells associated with a physical address 205-*b*-2, a third set of memory cells associated with a physical address 205-*b*-3, and a fourth set of memory cells associated with a physical address 205-*b*-4.

The one or more controllers 255 may manage storing data at the one or more memory dies 260. The data may include user data associated with a host device or metadata associated with the system 200. In some examples, the one or more controllers 255 may manage the physical locations of data within memory arrays of the memory dies 260 using a logical address space 210. The one or more controllers 255 may maintain a logical address space 210 that is associated with physical addresses 205 of the memory dies. For example, the logical address space 210 may include mappings between logical addresses 215 (e.g., of a set of logical addresses) and a physical address 205 at which data is stored. In some examples, the one or more controllers 255 may update the logical address space 210 as part of reading data from or writing data to the memory dies 260. The logical address space 210 may include a subset of logical addresses 220 used to store metadata associated with the system 200. Accordingly, the subset of logical addresses 220 may be referred to as a metaspace.

A memory die 260 may include one or more management counters 225, which may track metadata associated with operating the memory die 260. For example, a management counter 225 may track a quantity of access operations for a memory die 260 (e.g., the one or more management counters 225 may include a wear-leveling counter), a quantity of access operations for a particular bank or word line of a memory array of the memory die 260 (e.g., the one or more management counters 225 may include a row hammer counter), a quantity of instructions executed, or a combination thereof. The one or more management counters 225 of a memory die 260 may be disposed on (e.g., physically arranged on) the memory die 260 (e.g., a management counter 225 may be an example of an on-die counter). For example, the memory die 260-*a* may include a management counter 225-*a*-1 and a management counter 225-*a*-2, and the memory die 260-*b* may include a management counter 225-*b*-1 and a management counter 225-*b*-2. Although the example depicted in FIG. 2 shows two management counters 225 on each memory die 260, any quantity of management counter 225 may be disposed on a memory die 260, and each memory die 260 may include a different quantity of management counters 225.

The one or more controllers 255 may generate one or more logical counters (e.g., metacounters), and each logical counter may correspond to a management counter 225 of a memory die 260. In some instances, each logical counter may store an indication of a quantity of access operations performed on a memory die 260 and may be stored at the logical space 210. The one or more controllers 255 may provision (e.g., allocate, assign) one or more physical addresses 205 for storing the logical counters. For example, a first logical counter for the management counter 225-*a*-1 may be stored to the logical address 215-*a*, which may correspond to the physical address 205-*a*-4 of the memory die 260-*a*, and a second logical counter for the management counter 225-*b*-1 may be stored to the logical address 215-*b*, which may correspond to the physical address 205-*b*-1 of the memory die 260-*b*.

The one or more controllers 255 may read a value of a management counter 225 and store the value to the corresponding logical counter. For example, to read and store the value of the management counter 225-*a*-1 to the corresponding logical counter, the one or more controllers 255 may issue a command to the memory die 260-*a* to retrieve the value of the management counter 225-*a*-1. The one or more controllers 255 may receive the value, and, may store the value at the physical address 205-*a*-4 corresponding to the logical address 215-*a* associated with the logical counter. In some examples, as part of storing the value, the one or more controllers 255 may apply an error control code to the value. For example, the one or more controllers 255 may apply an error correction code (ECC) scheme to the value by generating one or more parity bits using the value. The value and corresponding parity bits may be stored to the physical address 205 of the one or memory dies (e.g., at a same physical address 205 as the value, or at a different physical address 205).

In some cases, the one or more controllers 255 may periodically update the value of a logical counter. For example, the one or more controllers 255 may determine whether a duration of time (e.g., a period) has elapsed since a prior read of a management counter 225. If the duration of time has elapsed, the one or more controllers 255 may perform a second read of the value of the management counter 225, and may update the logical counter with the recently read value (e.g., the one or more controllers 255 may store or overwrite the more recent value to the physical address 205 corresponding to the logical address 215 associated with the logical counter). Additionally, or alternatively, the one or more controllers 255 may update the value of a logical counter each time the system 200 performs a threshold quantity of access operations on a memory die 260. For example, the one or more controllers 255 may determine whether a quantity of access operations for a memory dies satisfies (e.g., exceeds) the threshold. If the quantity satisfies the threshold, the one or more controllers 255 may update the logical counter. In some cases, the periodicity of updating a logical counter may be configurable (e.g., by a host device, at manufacturing, etc.). For example, a host device may transmit a command to the one or more controllers to update the duration of time, the threshold, or both, according to a value included in the command.

In some examples, the system 200 may be configured to determine whether a management counter 225 has failed. For example, the one or more controllers 255 may determine whether the management counter 225 satisfies an error condition. If the management counter 225 satisfies the error condition (e.g., if the management counter 225 fails or is near failure), the one or more controllers 255 may initiate a recovery operation for the memory die 260 on which the failed management counter 225 is disposed.

In some cases, the recovery operation may include transferring data stored on the memory die 260 to a different memory die 260. For example, if the one or more controllers 255 determines that the management counter 225-*a*-1 satisfies the error condition, the one or more controllers 255 may transfer data (e.g., user data, metadata such as the value of a logical counter, or both) stored at the memory die 260-*a* to the memory die 260-*b*. Additionally, or alternatively, the recovery operation may include notifying a host device of the error condition. For example, in response to determining that a management counter 225 satisfies the error condition, the one or more controllers 255 may transmit an indication of the error condition to the host device. In some cases, the indication may include information about the failed management counter 225, such as the value of the logical counter associated with the failed management counter 225, an estimated remaining lifetime of the memory die 260 associated with the management counter (e.g., estimated quantity of additionally access operations until the memory die 260 fails), or both.

Using such techniques, the system 200 may improve the reliability of management counters 225. For example, system 200 may better-protect data stored in management counters 225 using error correction procedures performed by the one or more controllers 255. Additionally, if a management counter 225 of a memory die 260 fails, the one or more controllers 255 may transfer data stored on the memory die 260 (e.g., user data, logical counter data) to a separate memory die 260, which may improve the overall reliability and life of the system 200.

Figure 3:
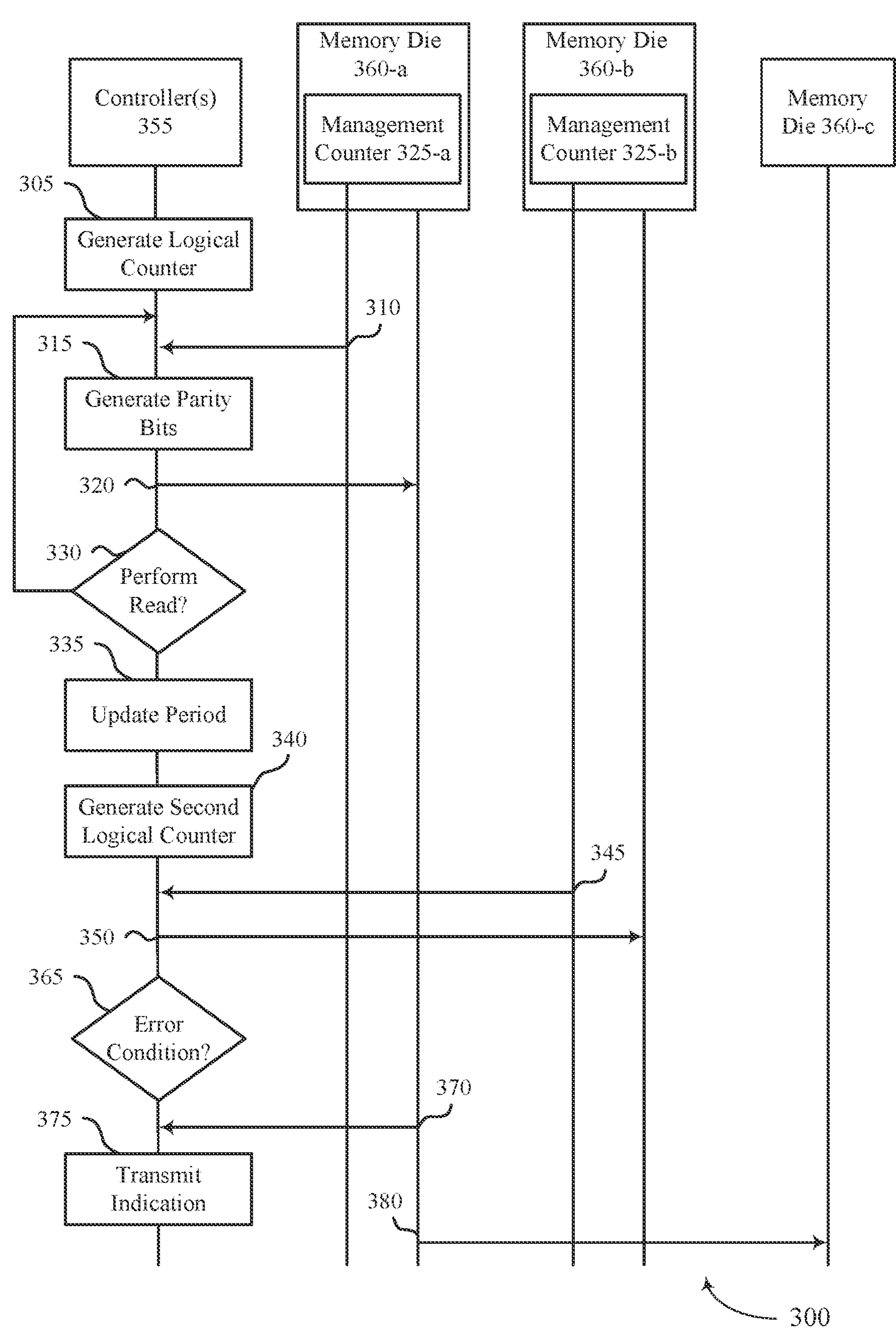
FIG. 3 illustrates an example of a process flow that supports logical counters for a memory system in accordance with examples as disclosed herein.

FIG. 3 illustrates an example of a process flow 300 that supports logical counters for a memory system in accordance with examples as disclosed herein. In some cases, process flow 300 may be implemented by aspects of the systems 100 and 200. For example, the process flow 300 may include operations performed by a memory device (e.g., a memory device 110) that includes one or more controllers 355, a memory die 360-*a* having a management counter 325-*a*, a memory die 360-*b* having a management counter 325-*b*, and a memory die 360-*c*, which may be examples of the corresponding components described in FIGS. 1 and 2. In the following description of the process flow 300, the operations may be performed in a different order than the order shown. For example, specific operations may also be left out of the process flow 300, or other operations may be added to process flow 300.

The process flow 300 may illustrate an example of the controller 355 (e.g., one or more controllers 355) generating and updating one or more logical counters corresponding to management counters 325 of the memory dies 360. For example, the controller 355 may periodically read a value from a management counter 325, and store the value in a memory array of a memory die 360. If the controller 355 determines that a management counter 325 has failed or may soon fail, the controller 355 may initiate a recovery operation using the stored value of the logical counter corresponding to the management counter 325. By utilizing logical counters as described herein, an associated memory device may preserve data when a management counter fails, which may improve its overall reliability and life.

Aspects of the process flow 300 may be implemented by one or more controllers, among other components. Additionally, or alternatively, aspects of the process flow 300 may be implemented as instructions stored in memory (e.g., firmware stored in a memory coupled with a host system or a memory system). For example, the instructions, when executed by one or more controllers (e.g., one or more controllers such as one or more of one or more controllers 355), may cause the controller to perform the operations of the process flow 300.

At 305, one or more controllers 355 may generate a logical counter associated with the management counter 325-*a* of the memory die 360-*a*. In some examples, the logical counter may store an indication of (e.g., a value corresponding to) a quantity of access operations performed on the memory die 360-*a*. The one or more controllers 355 may store the logical counter within a logical space (e.g., a logical address space 210) associated with the memory die 360-*a*. In some examples, generating the logical counter may include provisioning a set of physical addresses corresponding to the logical addresses associated with the logical counter.

At 310, the one or more controllers 355 may read a value from the management counter 325-*a* at a first time. For example, the one or more controllers 355 may transmit a command to the memory die 360-*a* to retrieve the value, or the one or more controllers 355 may directly read the value from the management counter 325-*a*. In some cases, the management counter 325-*a* may track a quantity of access operations performed on the memory die 360-*a* (e.g., the management counter 325-*a* may be a wear-leveling counter), a quantity of access operations for a bank or word line of a memory array of the memory die 360-*a* (e.g., the management counter 325-*a* may be a row hammer counter), or both.

At 315, the one or more controllers 355 may generate one or more parity bits associated with the value read from the management counter 325-*a*. For example, the one or more controllers 355 may perform an error correction operation (e.g., a single error correction (SEC) operation or a single error correction, double error detection (SECDED) operation) using the value to generate the one or more parity bits. In such examples, the one or more parity bits may be examples of error control information of an ECC scheme.

At 320, the one or more controllers 355 may store the value of the management counter 325-*a* to the logical counter. Additionally, the one or more controllers 355 may store the one or more parity bits associated with the value to the logical counter. In some cases, the one or more controllers 355 may write the value, the one or more parity bits, or both to the set of physical addresses associated with the logical counter (e.g., during a write operation). Accordingly, the one or more controllers 355 may store the value, the one or more parity bits, or both within one or more memory cells of a memory array of the memory die 360-*a*.

At 330, the one or more controllers 355 may determine whether a duration (e.g., a period, a time) has elapsed after the first time (e.g., the time at which the one or more controllers read the value from the management counter 325-*a* at 310). If the duration has elapsed, the process flow 300 may proceed to 310, and the one or more controllers 355 may update the logical counter. For example, the one or more controllers 355 may read a second value from the management counter 325-*a* at 310, may generate one or more parity bits associated with the second value at 315, and may store the second value to the set of physical addresses associated with the logical counter at 320.

Additionally, or alternatively, at 330, the one or more controllers 355 may determine whether a quantity of access operations performed on the memory die 360-*a* satisfies a threshold. If the quantity satisfies the threshold (e.g., if the quantity is greater than or equal to the threshold), the process flow 300 may proceed to 310, and the one or more controllers 355 may update the logical counter. For example, the one or more controllers 355 may read a third value from the management counter 325-*a* at 310, may generate one or more parity bits associated with the third value at 315, and may store the third value to the set of physical addresses associated with the logical counter at 320.

At 335, the one or more controllers 355 may update the duration (e.g., the period, the time), the threshold, or both. For example, the one or more controllers 355 may receive a command from a host device (e.g., a host device 105 as described with reference to FIG. 1). The command may include an indication of a second duration, a second threshold, or both. In response to the command, the one or more controllers 355 may update the duration to be the second duration, may update the threshold to be the second threshold, or both.

In some cases, the one or more controllers 355 may manage multiple management counters 325 for multiple memory dies 360. For example, at 340, the one or more controllers 355 may generate a second logical counter associated with the management counter 325-*b* of the memory die 360-*b*. In some cases, the one or more controllers 355 may store the second logical counter to a second subset of the logical space. The one or more controllers 355 may read a fourth value from the management counter 325-*b* at 345, may generate one or more parity bits associate with the fourth value, and may store the fourth value to the set of physical addresses associated with the second logical counter at 350.

At 365, the one or more controllers 355 may determine whether the management counter 325-*a* of the memory die 360-*a* satisfies an error condition (e.g., whether the management counter 325-*a* has failed or may soon fail). If the one or more controllers 355 determines that the management counter 325-*a* satisfies the error condition, the one or more controllers 355 may initiate a recovery operation for the memory die 360-*a*.

For example, at 370, the one or more controllers 355 may read the value of the logical counter, which may correspond to the last updated value for the management counter 325-*a*. In some cases, the one or more controllers 355 may read the one or more parity bits associated with the logical counter. In such cases, the one or more controllers 355 may perform an error control operation using the value and the one or more parity bits, which may detect or correct (or both) one or more errors in the value.

In some examples, as part of the recovery operation, the one or more controllers 355 may, at 375, transmit an indication of the error condition to a host device. The indication of the error condition may include the value read from the logical counter at 370, an estimated remaining lifetime of the memory die 360-*a*, or both. Additionally, or alternatively, the one or more controllers 355 may, at 380, transfer data from the memory die 360-*a* to the memory die 360-*c*.

Using such techniques, the process flow 300 may improve the reliability of management counters 325. For example, process flow 300 may better-protect data stored in management counters 325 using error correction procedures performed by the one or more controllers 355. Additionally, if a management counter 325 of a memory die 360 fails, the one or more controllers 355 may transfer data stored on the memory die 360 (e.g., user data, logical counter data) to a separate memory die 360, which may improve the overall reliability and life of the associated system.

Figure 4:
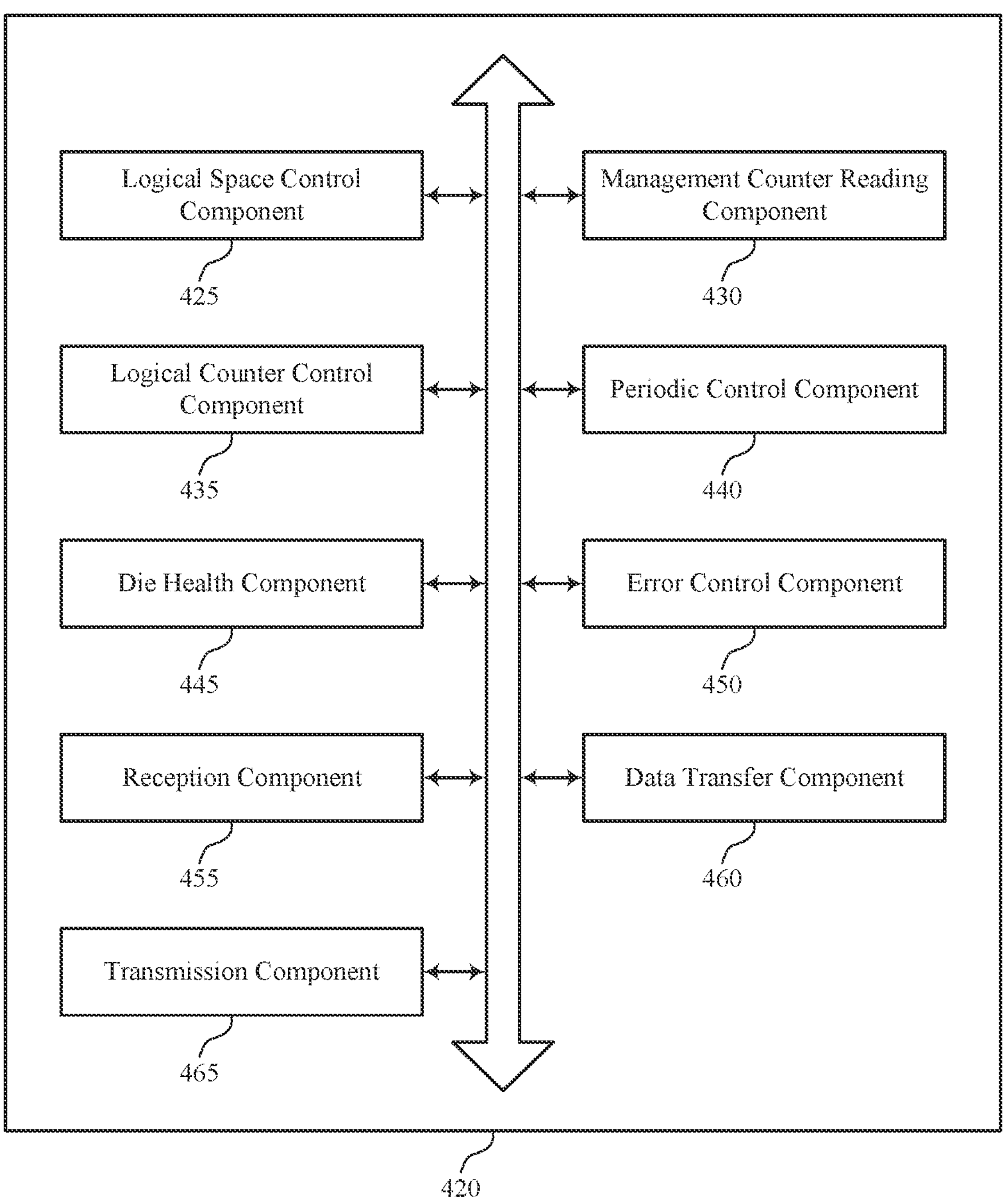
FIG. 4 illustrates a block diagram of a memory system that supports logical counters for a memory system in accordance with examples as disclosed herein.

FIG. 4 illustrates a block diagram 400 of a memory device 420 that supports logical counters for a memory system in accordance with examples as disclosed herein. The memory device 420 may be an example of aspects of a memory system as described with reference to FIGS. 1 through 3. The memory device 420, or various components thereof, may be an example of means for performing various aspects of logical counters for a memory system as described herein. For example, the memory device 420 may include a logical space control component 425, a management counter reading component 430, a logical counter control component 435, a periodic control component 440, a die health component 445, an error control component 450, a reception component 455, a data transfer component 460, a transmission component 465, or any combination thereof. Each of these components may communicate, directly or indirectly, with one another (e.g., via one or more buses).

The logical space control component 425 may be configured as or otherwise support a means for generating, by one or more controllers of a memory system, a logical counter associated with a management counter of a memory die of the memory system, where the logical counter stores a quantity of access operations performed on the memory die of the memory system at a logical space associated with the memory die. The management counter reading component 430 may be configured as or otherwise support a means for reading, by the one or more controllers, a value from the management counter based on generating the logical counter, where the management counter tracks a quantity of access operations performed on a memory die of the memory system. The logical counter control component 435 may be configured as or otherwise support a means for storing the value of the management counter to the logical counter based on reading the value from the management counter.

In some examples, the logical space control component 425 may be configured as or otherwise support a means for provisioning, by the one or more controllers, a subset of a plurality of physical addresses associated with the logical space, the subset of the plurality of physical addresses associated with the logical space for storing metadata associated with the memory die.

In some examples, the logical counter is associated with the subset of logical addresses.

In some examples, the value is read from the management counter at a first time, and the periodic control component 440 may be configured as or otherwise support a means for determining, by the one or more controllers, that a duration has elapsed after the first time. In some examples, the value is read from the management counter at a first time, and the management counter reading component 430 may be configured as or otherwise support a means for reading, by the one or more controllers, a second value from the management counter at a second time based on determining that the duration has elapsed. In some examples, the value is read from the management counter at a first time, and the logical counter control component 435 may be configured as or otherwise support a means for storing the second value of the management counter to the logical counter based on reading the second value from the management counter.

In some examples, the reception component 455 may be configured as or otherwise support a means for receiving a first command from a host system to update the duration to a second duration different than the duration. In some examples, the periodic control component 440 may be configured as or otherwise support a means for updating the duration to the second duration based on receiving the first command.

In some examples, the periodic control component 440 may be configured as or otherwise support a means for determining, by the one or more controllers, that a quantity of access operations performed on the memory die satisfies a threshold based on storing the value to the logical counter. In some examples, the management counter reading component 430 may be configured as or otherwise support a means for reading, by the one or more controllers, a third value from the management counter based on determining that the quantity of access operations performed on the memory die satisfies the threshold. In some examples, the logical counter control component 435 may be configured as or otherwise support a means for storing the third value to the logical counter based on reading the third value from the management counter.

In some examples, the reception component 455 may be configured as or otherwise support a means for receiving a second command from a host system to update the threshold to a second threshold different than the threshold. In some examples, the periodic control component 440 may be configured as or otherwise support a means for updating the threshold to the second threshold based on receiving the second command.

In some examples, the die health component 445 may be configured as or otherwise support a means for determining, by the one or more controllers, that the management counter of the memory die satisfies an error condition based on storing the value to the logical counter. In some examples, the die health component 445 may be configured as or otherwise support a means for initiating a recovery operation for the memory die based on determining that the management counter satisfies the error condition.

In some examples, the logical counter control component 435 may be configured as or otherwise support a means for reading, by the one or more controllers as part of the recovery operation, the value from the logical counter. In some examples, the data transfer component 460 may be configured as or otherwise support a means for transferring data from the memory die to a second memory die based on reading the value from the logical counter.

In some examples, the transmission component 465 may be configured as or otherwise support a means for transmitting, by the one or more controllers as part of the recovery operation, an indication of the error condition to a host system based on determining that the management counter of the memory die satisfies the error condition.

In some examples, the error control component 450 may be configured as or otherwise support a means for generating, by the one or more controllers and based on reading the value from the management counter, one or more parity bits associated with the value. In some examples, the error control component 450 may be configured as or otherwise support a means for storing the one or more parity bits to one or more physical addresses associated with the logical space.

In some examples, the logical space control component 425 may be configured as or otherwise support a means for generating, by the one or more controllers, a second logical counter associated with a second management counter of a third memory die of the memory system. In some examples, the management counter reading component 430 may be configured as or otherwise support a means for reading, by the one or more controllers, a second value from the second management counter based on generating the second logical counter. In some examples, the logical counter control component 435 may be configured as or otherwise support a means for storing the second value to one or more second physical addresses of the third memory die that are associated with the second logical counter based on reading the second value from the second management counter.

In some examples, the management counter includes a wear leveling counter or a row hammer counter.

Figure 5:
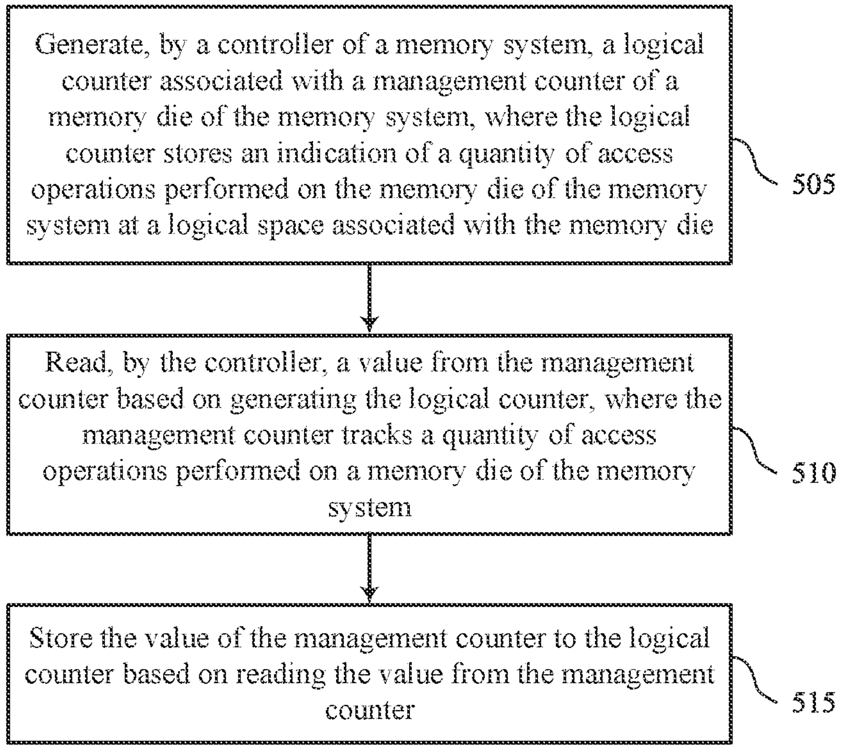
FIG. 5 illustrates a flowchart showing a method or methods that support logical counters for a memory system in accordance with examples as disclosed herein.

FIG. 5 illustrates a flowchart showing a method 500 that supports logical counters for a memory system in accordance with examples as disclosed herein. The operations of method 500 may be implemented by a memory device or its components as described herein. For example, the operations of method 500 may be performed by a memory device as described with reference to FIGS. 1 through 4. In some examples, a memory device may execute a set of instructions to control the functional elements of the device to perform the described functions. Additionally, or alternatively, the memory device may perform aspects of the described functions using special-purpose hardware.

At 505, the method may include generating, by one or more controllers of a memory system, a logical counter associated with a management counter of a memory die of the memory system, where the logical counter stores a quantity of access operations performed on the memory die of the memory system at a logical space associated with the memory die. The operations of 505 may be performed in accordance with examples as disclosed herein. In some examples, aspects of the operations of 505 may be performed by a logical space control component 425 as described with reference to FIG. 4.

At 510, the method may include reading, by the one or more controllers, a value from the management counter based on generating the logical counter, where the management counter tracks a quantity of access operations performed on a memory die of the memory system. The operations of 510 may be performed in accordance with examples as disclosed herein. In some examples, aspects of the operations of 510 may be performed by a management counter reading component 430 as described with reference to FIG. 4.

At 515, the method may include storing the value of the management counter to the logical counter based on reading the value from the management counter. The operations of 515 may be performed in accordance with examples as disclosed herein. In some examples, aspects of the operations of 515 may be performed by a logical counter control component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for generating, by one or more controllers of a memory system, a logical counter associated with a management counter of a memory die of the memory system, where the logical counter stores a quantity of access operations performed on the memory die of the memory system at a logical space associated with the memory die; reading, by the one or more controllers, a value from the management counter based on generating the logical counter, where the management counter tracks a quantity of access operations performed on a memory die of the memory system; and storing the value of the management counter to the logical counter based on reading the value from the management counter.

Aspect 2: The method, apparatus, or non-transitory computer-readable medium of aspect 1, further including operations, features, circuitry, logic, means, or instructions, or any combination thereof for provisioning, by the one or more controllers, a subset of a plurality of physical addresses associated with the logical space, the subset of the plurality of physical addresses associated with the logical space for storing metadata associated with the memory die.

Aspect 3: The method, apparatus, or non-transitory computer-readable medium of aspect 2, where the logical counter is associated with the subset of logical addresses.

Aspect 4: The method, apparatus, or non-transitory computer-readable medium of any of aspects 1 through 3, where the value is read from the management counter at a first time and the method, apparatuses, and non-transitory computer-readable medium further includes operations, features, circuitry, logic, means, or instructions, or any combination thereof for determining, by the one or more controllers, that a duration has elapsed after the first time; reading, by the one or more controllers, a second value from the management counter at a second time based on determining that the duration has elapsed; and storing the second value of the management counter to the logical counter based on reading the second value from the management counter.

Aspect 5: The method, apparatus, or non-transitory computer-readable medium of aspect 4, further including operations, features, circuitry, logic, means, or instructions, or any combination thereof for receiving a first command from a host system to update the duration to a second duration different than the duration and updating the duration to the second duration based on receiving the first command.

Aspect 6: The method, apparatus, or non-transitory computer-readable medium of any of aspects 1 through 5, further including operations, features, circuitry, logic, means, or instructions, or any combination thereof for determining, by the one or more controllers, that a quantity of access operations performed on the memory die satisfies a threshold based on storing the value to the logical counter; reading, by the one or more controllers, a third value from the management counter based on determining that the quantity of access operations performed on the memory die satisfies the threshold; and storing the third value to the logical counter based on reading the third value from the management counter.

Aspect 7: The method, apparatus, or non-transitory computer-readable medium of aspect 6, further including operations, features, circuitry, logic, means, or instructions, or any combination thereof for receiving a second command from a host system to update the threshold to a second threshold different than the threshold and updating the threshold to the second threshold based on receiving the second command.

Aspect 8: The method, apparatus, or non-transitory computer-readable medium of any of aspects 1 through 7, further including operations, features, circuitry, logic, means, or instructions, or any combination thereof for determining, by the one or more controllers, that the management counter of the memory die satisfies an error condition based on storing the value to the logical counter and initiating a recovery operation for the memory die based on determining that the management counter satisfies the error condition.

Aspect 9: The method, apparatus, or non-transitory computer-readable medium of aspect 8, further including operations, features, circuitry, logic, means, or instructions, or any combination thereof for reading, by the one or more controllers as part of the recovery operation, the value from the logical counter and transferring data from the memory die to a second memory die based on reading the value from the logical counter.

Aspect 10: The method, apparatus, or non-transitory computer-readable medium of any of aspects 8 through 9, further including operations, features, circuitry, logic, means, or instructions, or any combination thereof for transmitting, by the one or more controllers as part of the recovery operation, an indication of the error condition to a host system based on determining that the management counter of the memory die satisfies the error condition.

Aspect 11: The method, apparatus, or non-transitory computer-readable medium of any of aspects 1 through 10, further including operations, features, circuitry, logic, means, or instructions, or any combination thereof for generating, by the one or more controllers and based on reading the value from the management counter, one or more parity bits associated with the value and storing the one or more parity bits to one or more physical addresses associated with the logical space.

Aspect 12: The method, apparatus, or non-transitory computer-readable medium of any of aspects 1 through 11, further including operations, features, circuitry, logic, means, or instructions, or any combination thereof for generating, by the one or more controllers, a second logical counter associated with a second management counter of a third memory die of the memory system; reading, by the one or more controllers, a second value from the second management counter based on generating the second logical counter; and storing the second value to one or more second physical addresses of the third memory die that are associated with the second logical counter based on reading the second value from the second management counter.

Aspect 13: The method, apparatus, or non-transitory computer-readable medium of any of aspects 1 through 12, where the management counter includes a wear leveling counter or a row hammer counter.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The term “isolated” refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be “on” or “activated” when a voltage greater than or equal to the transistor’s threshold voltage is applied to the transistor gate. The transistor may be “off” or “deactivated” when a voltage less than the transistor’s threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:

generating, by a controller of a memory system, a logical counter associated with a management counter of a memory die of the memory system, wherein the logical counter stores, at a logical space associated with the memory die, a value indicating a quantity of access operations performed on the memory die of the memory system;

reading, by the controller, the value from the management counter based on generating the logical counter and in accordance with a duration, wherein the management counter tracks the quantity of access operations performed on the memory die of the memory system;

storing the value of the management counter to the logical counter based on reading the value from the management counter; and transmitting, based on determining that the management counter satisfies an error condition, an indication of the error condition to a host system.

2. The method of claim 1, further comprising:

provisioning, by the controller, a subset of a plurality of physical addresses associated with the logical space, the subset of the plurality of physical addresses associated with the logical space for storing metadata associated with the memory die.

3. The method of claim 2, wherein the logical counter is associated with a subset of logical addresses corresponding to the subset of the plurality of physical addresses.

4. The method of claim 1, wherein the value is read from the management counter at a first time in accordance with the duration, the method further comprising:

determining, by the controller, that the duration has elapsed after the first time;

reading, by the controller, a second value from the management counter at a second time based on determining that the duration has elapsed; and storing the second value of the management counter to the logical counter based on reading the second value from the management counter.

5. The method of claim 4, further comprising:

receiving a first command from the host system to update the duration to a second duration different than the duration; and updating the duration to the second duration based on receiving the first command.

6. The method of claim 1, further comprising:

determining, by the controller, that the quantity of access operations performed on the memory die satisfies a threshold based on storing the value to the logical counter;

reading, by the controller, a third value from the management counter based on determining that the quantity of access operations performed on the memory die satisfies the threshold; and storing the third value to the logical counter based on reading the third value from the management counter.

7. The method of claim 6, further comprising:

receiving a second command from the host system to update the threshold to a second threshold different than the threshold; and updating the threshold to the second threshold based on receiving the second command.

8. The method of claim 1, further comprising:

determining, by the controller, that the management counter of the memory die satisfies the error condition based on storing the value to the logical counter; and initiating a recovery operation for the memory die based on determining that the management counter satisfies the error condition.

9. The method of claim 8, further comprising:

reading, by the controller as part of the recovery operation, the value from the logical counter; and transferring data from the memory die to a second memory die based on reading the value from the logical counter.

10. The method of claim 8, further comprising:

transmitting, by the controller as part of the recovery operation, the indication of the error condition to the host system based on determining that the management counter of the memory die satisfies the error condition.

11. The method of claim 1, further comprising:

generating, by the controller and based on reading the value from the management counter, one or more parity bits associated with the value; and storing the one or more parity bits to one or more physical addresses associated with the logical space.

12. The method of claim 1, further comprising:

generating, by the controller, a second logical counter associated with a second management counter of a third memory die of the memory system;

reading, by the controller, a second value from the second management counter based on generating the second logical counter; and storing the second value to one or more second physical addresses of the third memory die that are associated with the second logical counter based on reading the second value from the second management counter.

13. The method of claim 1, wherein the management counter comprises a wear leveling counter or a row hammer counter.

14. A non-transitory computer-readable medium storing code, the code comprising instructions executable by a processor to:

generate, by a controller of a memory system, a logical counter associated with a management counter of a memory die of the memory system, wherein the logical counter stores, at a logical space associated with the memory die, a value indicating a quantity of access operations performed on the memory die of the memory system;

read, by the controller, the value from the management counter based on generating the logical counter and in accordance with a duration, wherein the management counter tracks the quantity of access operations performed on the memory die of the memory system;

store the value of the management counter to the logical counter based on reading the value from the management counter; and transmitting, based on determining that the management counter satisfies an error condition, an indication of the error condition to a host system.

15. The non-transitory computer-readable medium of claim 14, wherein the instructions are further executable by the processor to:

provision, by the controller, a subset of a plurality of physical addresses associated with the logical space, the subset of the plurality of physical addresses associated with the logical space for storing metadata associated with the memory die.

16. The non-transitory computer-readable medium of claim 15, wherein the logical counter is associated with a subset of logical addresses corresponding to the subset of the plurality of physical addresses.

17. The non-transitory computer-readable medium of claim 14, wherein the value is read from the management counter at a first time in accordance with the duration, and the instructions are further executable by the processor to:

determine, by the controller, that the duration has elapsed after the first time;

read, by the controller, a second value from the management counter at a second time based on determining that the duration has elapsed; and store the second value of the management counter to the logical counter based on reading the second value from the management counter.

18. The non-transitory computer-readable medium of claim 17, wherein the instructions are further executable by the processor to:

receive a first command from the host system to update the duration to a second duration different than the duration; and update the duration to the second duration based on receiving the first command.

19. The non-transitory computer-readable medium of claim 14, wherein the instructions are further executable by the processor to:

determine, by the controller, that the quantity of access operations performed on the memory die satisfies a threshold based on storing the value to the logical counter;

read, by the controller, a third value from the management counter based on determining that the quantity of access operations performed on the memory die satisfies the threshold; and store the third value to the logical counter based on reading the third value from the management counter.

20. An apparatus, comprising: one or more controllers associated with a memory device, wherein the one or more controllers are configured to cause the apparatus to:

generate, by a controller of a memory system, a logical counter associated with a management counter of a memory die of the memory system, wherein the logical counter stores, at a logical space associated with the memory die, a value indicating a quantity of access operations performed on the memory die of the memory system;

read, by the controller, the value from the management counter based on generating the logical counter and in accordance with a duration, wherein the management counter tracks the quantity of access operations performed on the memory die of the memory system;

store the value of the management counter to the logical counter based on reading the value from the management counter; and transmitting, based on determining that the management counter satisfies an error condition, an indication of the error condition to a host system.

* * * * *